United States Patent
Karimi

(10) Patent No.: US 12,296,261 B2
(45) Date of Patent: May 13, 2025

(54) CUSTOMIZABLE VIRTUAL REALITY SCENES USING EYE TRACKING

(71) Applicant: Sony Interactive Entertainment Inc., Tokyo (JP)

(72) Inventor: Sepideh Karimi, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 364 days.

(21) Appl. No.: 18/045,777

(22) Filed: Oct. 11, 2022

(65) Prior Publication Data

US 2024/0115942 A1   Apr. 11, 2024

(51) Int. Cl.
A63F 13/52 (2014.01)
A63F 13/212 (2014.01)
A63F 13/533 (2014.01)
G06F 3/01 (2006.01)

(52) U.S. Cl.
CPC ............ *A63F 13/52* (2014.09); *A63F 13/212* (2014.09); *A63F 13/533* (2014.09); *G06F 3/013* (2013.01); *A63F 2300/1012* (2013.01); *A63F 2300/308* (2013.01); *A63F 2300/66* (2013.01); *A63F 2300/8082* (2013.01)

(58) Field of Classification Search
CPC ...... A63F 13/52; A63F 13/212; A63F 13/533; A63F 2300/1012; A63F 2300/308; A63F 2300/66; A63F 2300/8082; A63F 13/5255; A63F 13/213; G06F 3/013
See application file for complete search history.

(56) References Cited

U.S. PATENT DOCUMENTS

| | | | |
|---|---|---|---|
| 8,531,354 B2 * | 9/2013 | Woodard | G09G 5/00 345/7 |
| 10,409,363 B1 * | 9/2019 | Kudirka | A63F 13/211 |
| 2013/0083011 A1 * | 4/2013 | Geisner | G06F 3/013 345/419 |
| 2013/0095924 A1 | 4/2013 | Geisner et al. | |
| 2016/0180591 A1 * | 6/2016 | Shiu | G06F 1/163 345/633 |
| 2016/0300392 A1 * | 10/2016 | Jonczyk | G06T 19/003 |
| 2017/0124928 A1 * | 5/2017 | Edwin | G02B 27/01 |
| 2017/0235362 A1 * | 8/2017 | Thunström | G06F 3/013 345/428 |
| 2017/0287225 A1 * | 10/2017 | Powderly | G06F 3/017 |
| 2018/0311585 A1 * | 11/2018 | Osman | A63F 13/26 |
| 2019/0111347 A1 * | 4/2019 | Rimon | A63F 13/212 |
| 2019/0371075 A1 * | 12/2019 | Stafford | G06F 3/0482 |
| 2020/0081525 A1 * | 3/2020 | Peterson | B60K 35/10 |

OTHER PUBLICATIONS

"International Search Report and Written Opinion", dated Mar. 14, 2024, from the counterpart PCT application PCT/US23/76394.

* cited by examiner

*Primary Examiner* — Kurt Fernstrom
*Assistant Examiner* — Selwa A Alsomairy
(74) *Attorney, Agent, or Firm* — Fish & Richardson P.C.

(57) ABSTRACT

Eye tracking of the wearer of a virtual reality headset is used to customize/personalize VR video. Based on eye tracking, the VR scene may present different types of trees for different types of gaze directions. As another example, based on gaze direction, a VR scene can be augmented with additional objects based on gaze direction at a particular related object. A friend's gaze-dependent personalization may be imported into the wearer's system to increase companionship and user engagement. Customized options can be recorded and sold to other players.

20 Claims, 8 Drawing Sheets

CUSTOMIZABLE VIRTUAL REALITY SCENES USING EYE TRACKING

FIELD

The present application relates generally to customizable virtual reality scenes using eye tracking.

BACKGROUND

As understood herein, virtual reality (VR) computer simulations such as computer games are gaining in widespread popularity. As also understood herein, personalizing VR scenes can provide new and enjoyable game experiences as well as companionship and commerce through sharing personalized VR experiences.

SUMMARY

Accordingly, an apparatus includes at least one processor configured to execute eye tracking of a player of a computer simulation, and based at least in part on the eye tracking, personalize at least one background object in at least one scene of the computer simulation presented on at least one display.

In some embodiments the eye tracking is executed using at least one camera on at least one computer simulation headset.

In examples, the background object can include a tree or a landscape such as a cliff. For instance, the processor may be configured to personalize the background object at least in part by presenting a first image next to a cliff responsive to a first gaze direction and presenting a second image next to the cliff responsive to a second gaze direction.

In some example implementations the player is a first player and the processor is configured to receive a gaze-dependent personalization of a second player, and present to the first player the gaze-dependent personalization of the second player.

In non-limiting examples the processor may be configured to personalize the background object such that at least one background scene is presented that is altered from the background scene without personalization.

In non-limiting examples the processor may be configured to present a prompt for the player to indicate agreement with a first object indicated by the eye tracking.

In another aspect, a method includes identifying a gaze direction of at least one player of a computer simulation, and based at least in part on the gaze direction, alter non-character background scenery in the computer simulation.

In another aspect, a device includes at least one computer storage that is not a transitory signal and that in turn includes instructions executable by at least one processor to identify a first gaze direction of a player wearing a virtual reality (VR) or augmented reality (AR) headset configured to present at least one computer simulation. The instructions are executable to, based at least in part on the first gaze direction, change an appearance of at least one background object in the computer simulation in a first way. The instructions further are executable to identify a second gaze direction of the player, and based at least in part on the second gaze direction, not change the appearance of the at least one background object in the computer simulation.

The details of the present application, both as to its structure and operation, can be best understood in reference to the accompanying drawings, in which like reference numerals refer to like parts, and in which:

DETAILED DESCRIPTION

Figure 1:
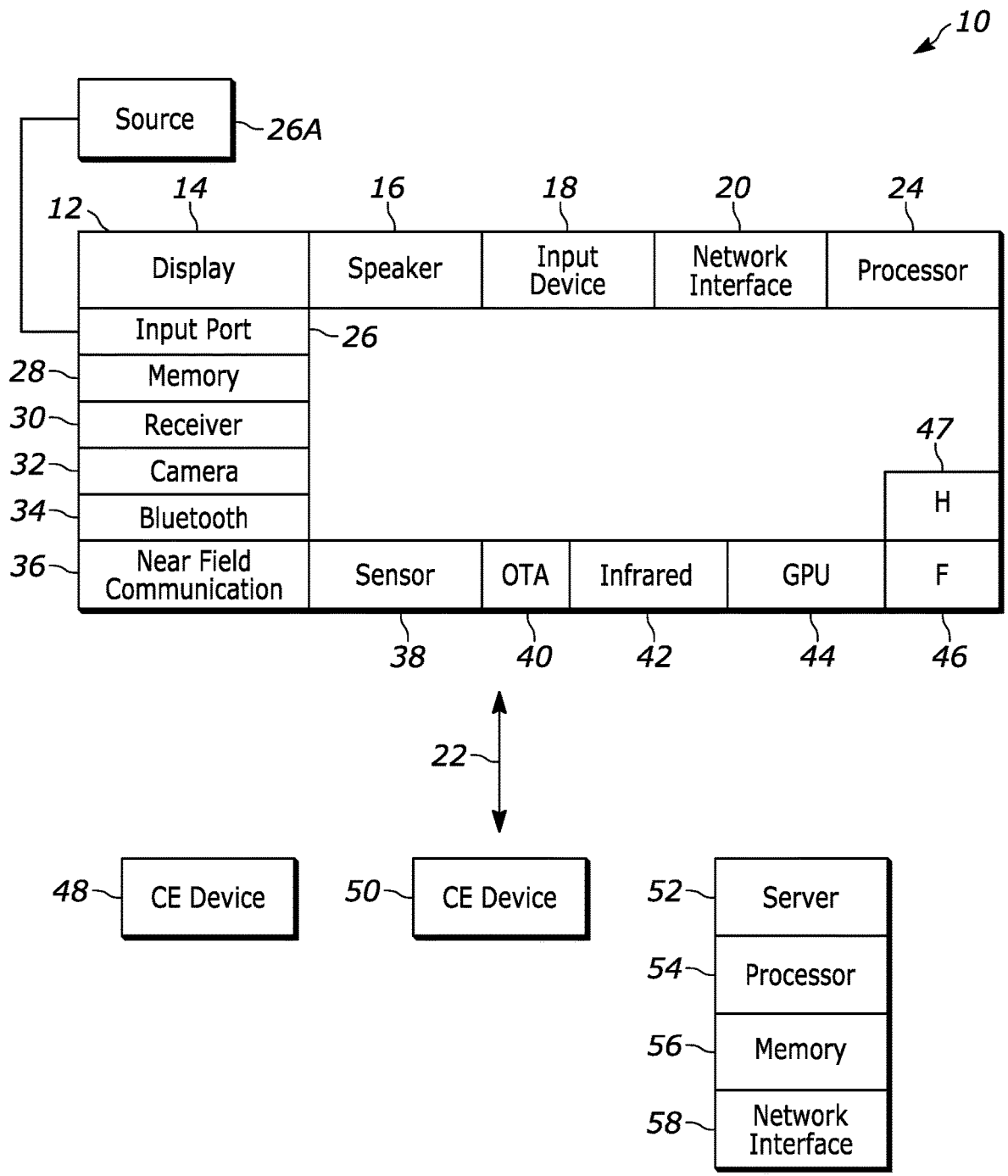
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
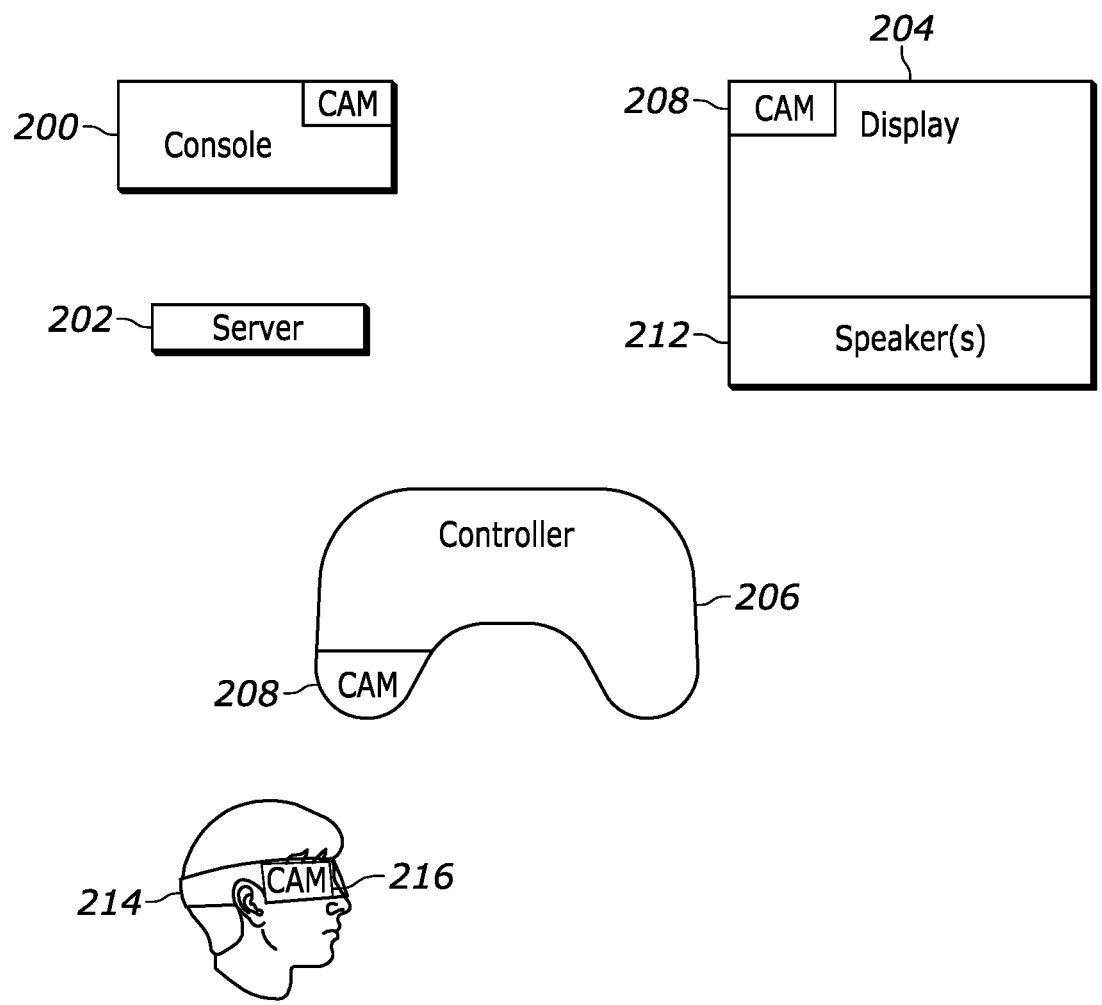
FIG. 2 illustrates an example specific system consistent with present principles.

Refer now to FIG. 2. A computer simulation such as a computer game may be sent from a computer game console 200 or a computer game server 202 to a display device 204 such as a TV for presentation of the computer simulation under control of one or more computer simulation controllers 206, such as but not limited to a PlayStation® controller or other controller.

One or more cameras 208 may be provided on the controller 206 and/or console 200 and/or display 204. The controller 206 can be operated by a player 210 to control presentation of the computer simulation. Audio sourced from the game console 200 or server 202 is played on one or more speakers 212 of a speaker system. The player 210 may wear a virtual reality (VR) or augmented reality (AR) headset 214 which also may have one or more cameras 216 such as inward-facing cameras for eye tracking.

The elements of the system shown in FIG. 2 can incorporate some or all of the appropriate devices and components described above in reference to FIG. 1.

Figure 3:
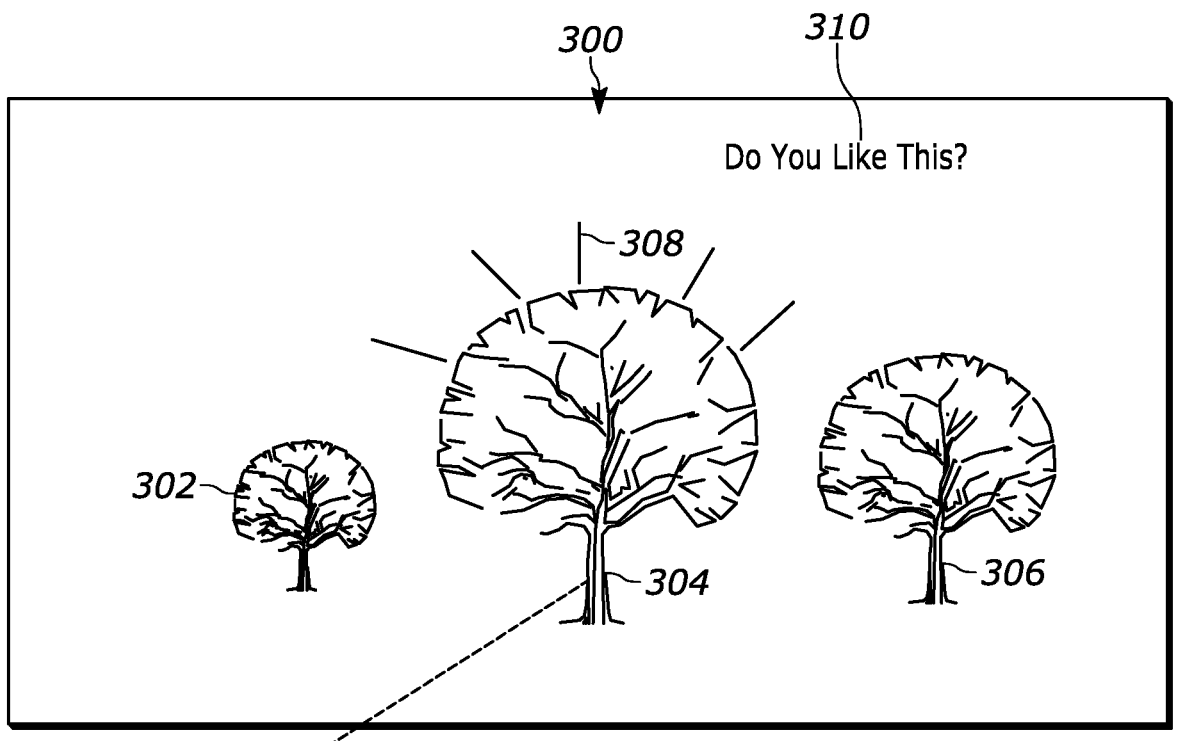
FIG. 3 illustrates a screen shot of an example computer simulation scene that has not been personalized and hence is presented to all players of the simulation, schematically illustrating the player.

FIG. 3 illustrates a screen shot 300 that can be presented on any display herein of an example computer simulation scene that has not been personalized and hence is presented to all players of the simulation, schematically illustrating the player at 312. As shown, three trees 302, 304, 306 appear in the background of the scene. The trees may be different from each other, e.g., one tree 302 may be a pine, one tree 304 may be a maple, and one tree 306 may be an aspen.

As illustrated, the player's gaze is directed to the middle tree 304, and this is determined by using images from any of the cameras herein as input to eye tracking software. The tree may be highlighted or vibrate as indicated by the lines 308 in response, and a prompt 310 may appear confirming whether the player indeed likes the tree he is looking at and thus wishes to personalize the scene to have more of the same type of tree. The player may confirm by, e.g., blinking a set number of times, or operating the controller 204 shown in FIG. 2 to provide a "yes" response, or by voice, which may be detected by a microphone and recognized as an affirmation by a machine learning voice-to-text model. Or, the personalization may occur automatically without further player affirmation without interrupting the game.

Figure 4:
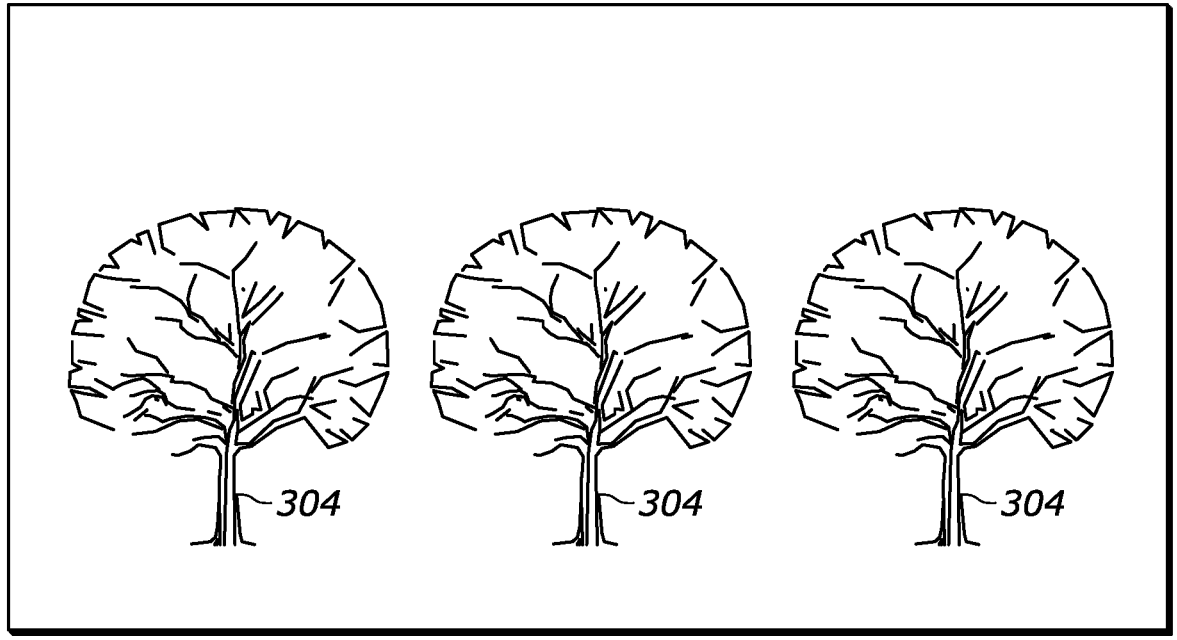
FIG. 4 illustrates a screen shot of an example computer simulation scene that has been personalized relative to FIG. 3.

In response to the player confirming the selection of the middle (maple) tree 304, FIG. 4 illustrates the scene is changed to present more maple trees 304 than the unmodified scene in FIG. 3.

Figure 5:
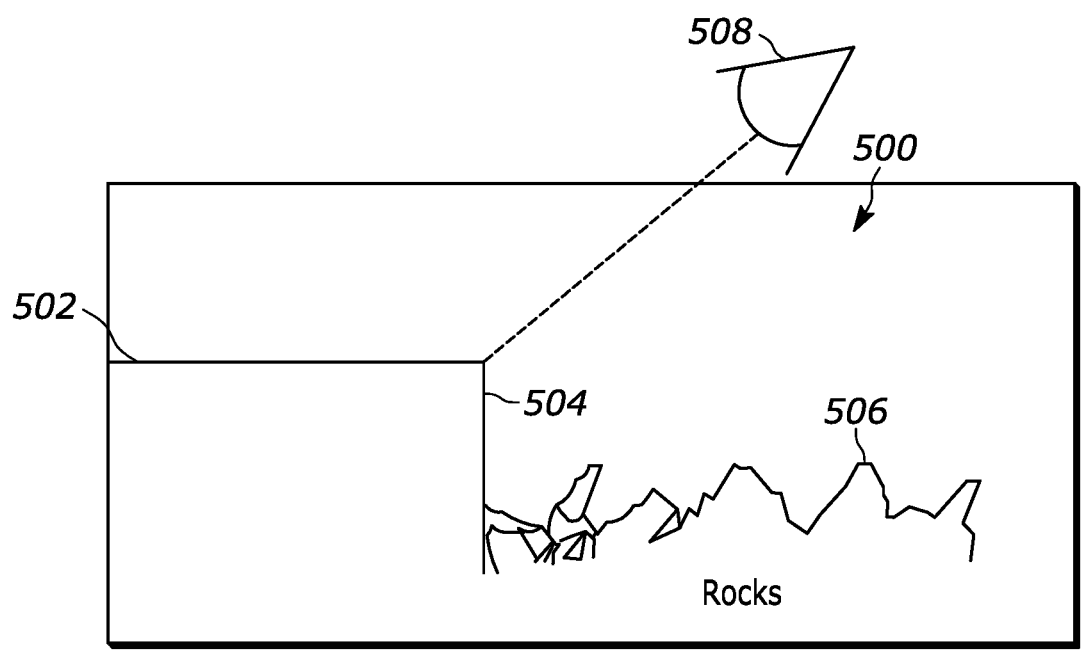
FIG. 5 illustrates a screen shot of another example computer simulation scene that has not been personalized and hence is presented to all players of the simulation, schematically illustrating the player with a first direction of gaze.

FIGS. 5-8 illustrate another example of personalizing backgrounds in computer scenes according to player gaze tracking. In FIG. 5 a screen shot 500 is shown of another example computer simulation scene that has not yet been personalized to a player and hence is presented to all players of the simulation, schematically illustrating the player 508 with a first direction of gaze, specifically, at a background mesa 502 ending in a cliff 504 that drops to a jagged rock bottom 506.

Figure 6:
FIG. 6 illustrates a screen shot of an example computer simulation scene that has been personalized relative to FIG. 5 for the first direction of gaze.
Figure 6:
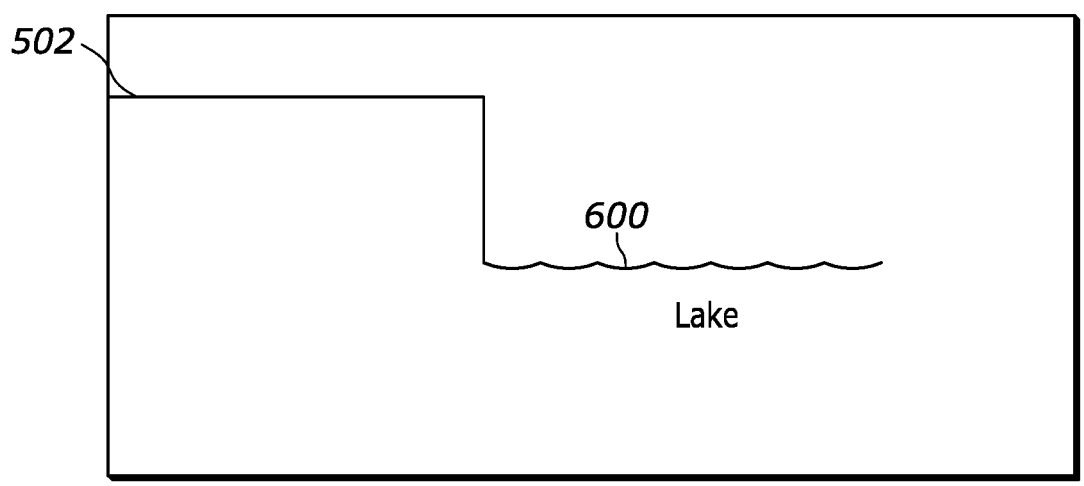

FIG. 6 illustrates that responsive to the player's gaze being at the top of the cliff 504 on the mesa 502, the player might be uncomfortable viewing heights. In this case, the background scene has been personalized to replace the jagged rock bottom with a lake 600 whose surface is just below the mesa 502.

Figure 7:
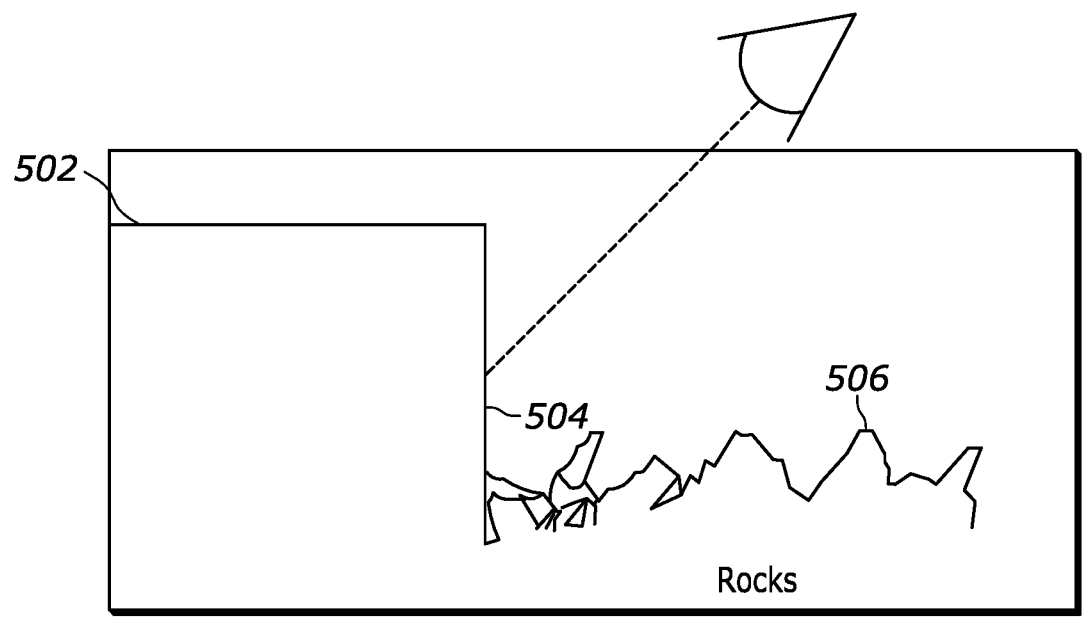
FIG. 7 illustrates a screen shot of the example computer simulation scene of FIG. 5 schematically illustrating the player with a second direction of gaze.
Figure 8:
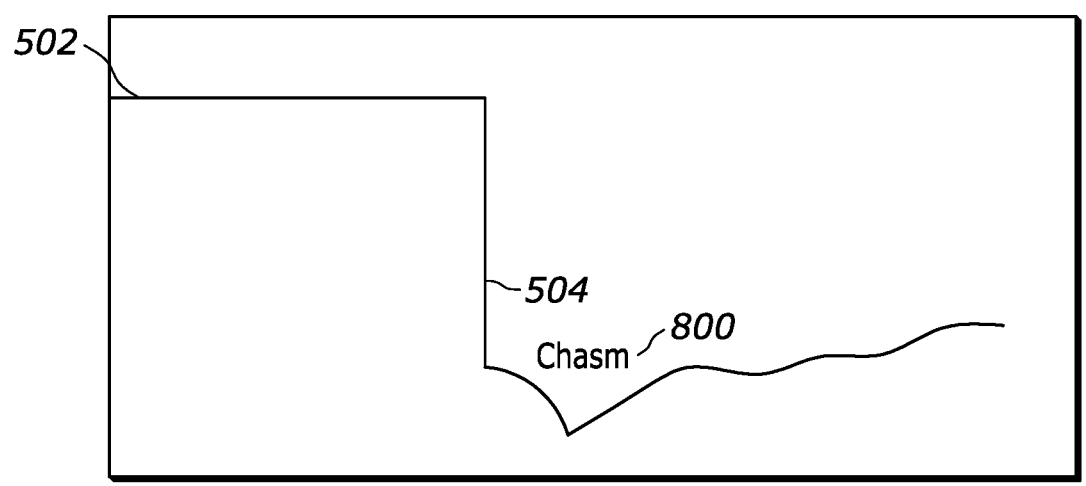
FIG. 8 illustrates a screen shot of an example computer simulation scene that has been personalized relative to FIG. 7 for the second direction of gaze.

On the other hand, FIG. 7 illustrates a screen shot of the example computer simulation scene of FIG. 5 schematically illustrating the player with a second direction of gaze, in this case, near the middle or bottom of the cliff 504. Inferring that this might indicate a player seeking even more adventure, the scene is personalized as shown in FIG. 8 to add a deep chasm 800 in the jagged rock bottom 506.

In personalizing the background scene by, e.g., altering or modifying the non-character objects in the scene, machine learning (ML) may be employed. A ML model may be training on training data that includes many different scenes and ground truth labels as to how the scenes can be modified to account for various ground truth player gaze directions.

Figure 9:
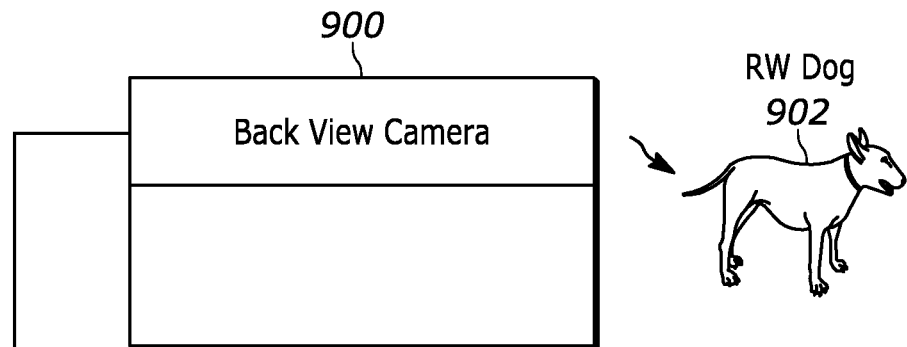
FIG. 9 illustrates a back view camera and a real world object, in this case, a dog.
Figure 10:
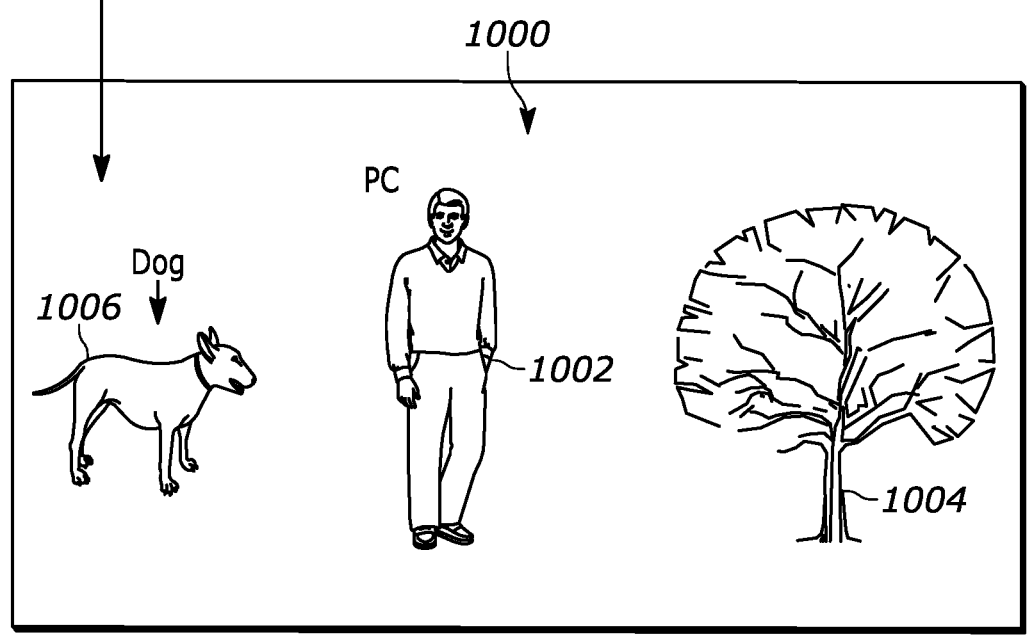
FIG. 10 illustrates a screen shot of an example scene personalized using the back view camera of FIG. 9.

Turn now to FIGS. 9 and 10. FIG. 9 illustrates a back view camera 900, e.g., on the rear of the headset shown in FIG. 2, and a real world object 902, in this case, a dog. Images from the back view camera 900 of the real world object 902 may be presented on a scene 1000 of a computer simulation in which a player character 1002 encounters background scene objects 1004, with a virtual image 1006 of the real world object 902 from FIG. 9 being presented behind the PC 1002 in the same relative location to the PC 1002 as the real world object 902 is to the player.

Figure 11:
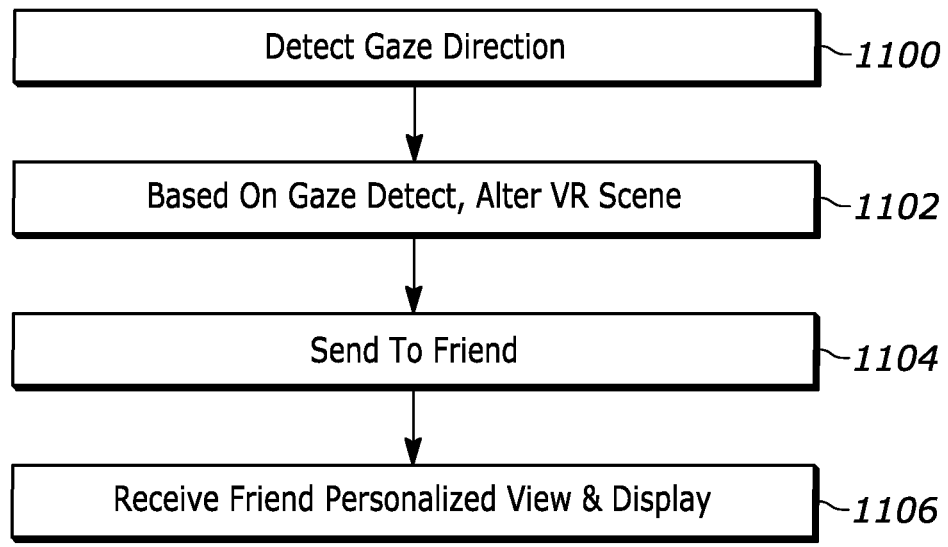
FIG. 11 illustrates example logic in example flow chart format consistent with present principles.

FIG. 11 illustrates example logic in example flow chart format in which the player's gaze direction at background scene objects on a display such as the display 204 or headset 214 display shown in FIG. 2 is determined according to principles set forth herein.

Moving to block 1102, based on the gaze direction, the scene is personalized to the player whose gaze is monitored.

Proceeding to block 1104, if desired, the personalization (i.e., data indicating what has changed based on the player's gaze direction) may be sent to another player such as a gamer friend. In exchange, the gamer friend's personalization data ay be received at block 1106 and displayed.

Figure 12:
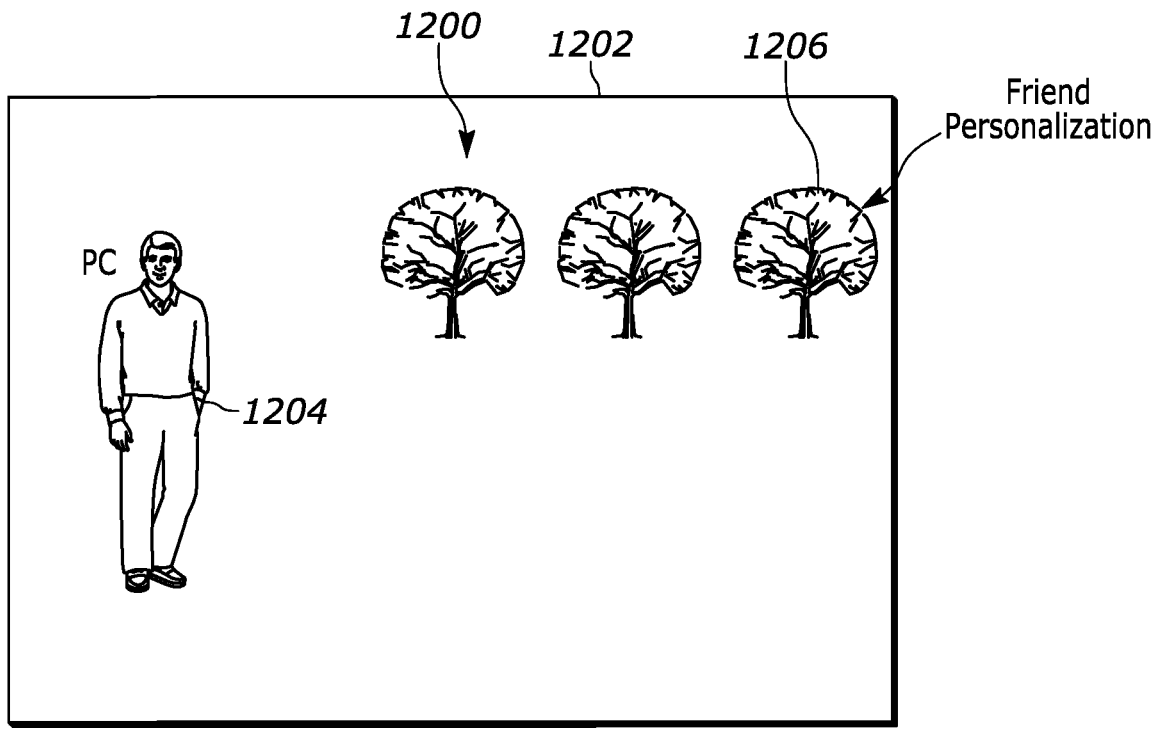
FIG. 12 illustrates an example screen shot consistent with FIG. 11 in which personalization is shared among friends.

FIG. 12 illustrates an example screen shot 1200 that may be presented on a display 1202 such as any display herein consistent with FIG. 11 in which personalization is shared among friends. The PC 1204 is shown gazing at background 1206 that has been received from another player and that was personalized to the other player.

Figure 13:
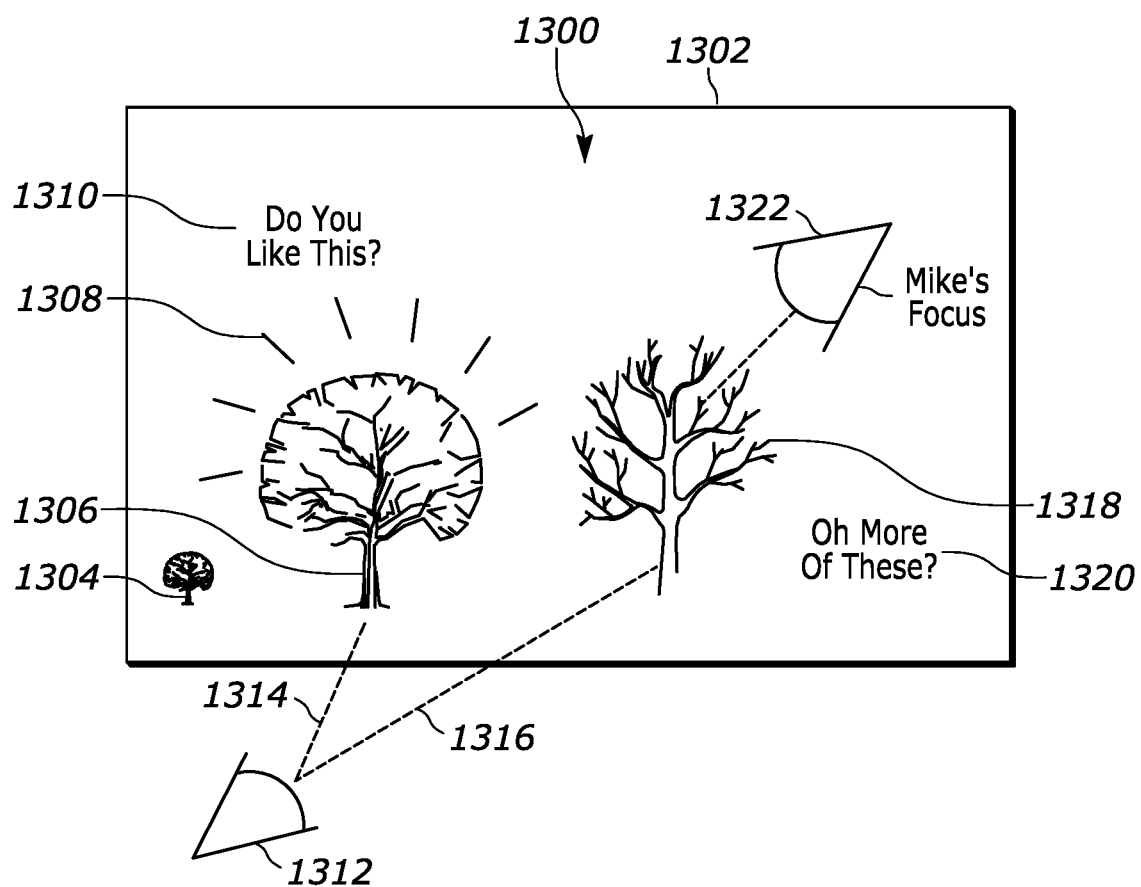
FIG. 13 is a screen shot of an example simulation scene illustrating further personalization principles.

FIG. 13 is a screen shot 1300 of an example simulation scene illustrating further personalization principles that may be presented on a display 1302 such as any display herein. The scene includes two trees 1304, 1306 that may be different types of trees as in FIGS. 3 and 4. As illustrated, the gaze 1314 of the player 1312 is directed to the taller tree 1306, and this is determined by using images from any of the cameras herein as input to eye tracking software. The tree may be highlighted or vibrate as indicated by the lines 1308 in response, and a prompt 1310 may appear confirming whether the player indeed likes the tree he is looking at and thus wishes to personalize the scene to have more of the same type of tree.

In FIG. 13, however, the player has averted his gaze as illustrated by the dashed line 1316 to a third tree 1318, e.g., a bristlecone pine. A second prompt 1320 may in response to the new gaze direction appear asking if the player likes this second tree he has gazed at. The player may confirm by, e.g., blinking a set number of times, or operating the controller 204 shown in FIG. 2 to provide a "yes" response, or by voice, which may be detected by a microphone and recognized as an affirmation by a machine learning voice-to-text model. Or, the personalization may occur automatically without further player affirmation without interrupting the game.

In sharing and/or combining personalizations with other players, one player may assume the lead, e.g., the lead's personalization is presented on other displays, but the personalizations of the other players are not shared. The lead may be conferred on the highest ranking friend in the group according to the game system or the most popular player in the group on social media. Yet again, the first player to engage other players and invite them to share their personalizations may be given precedence. All friends eyes are tracked along with their voices being recorded and shared and merged in one scene. Moreover, a reticule 1322 (FIG. 13) may be presented on a first player's display illustrating where a second player is focused so the first player better understands how and why the second player's scene was personalized.

In addition to the above, the personalizations may be monetized by allowing content creators to sell options to players to purchase the personalizations of other players.

While the particular embodiments are herein shown and described in detail, it is to be understood that the subject matter which is encompassed by the present invention is limited only by the claims.

What is claimed is:

1. A method, comprising:
    receiving, by a computing device of a first user, gaze-dependent personalization data of a different, second user, the gaze-dependent personalization data identifying one or more respective personalized appearance characteristics that (i) the second user has associated with particular types of virtual objects, and (ii) are to be used to alter an appearance of virtual objects of a particular type within a computer simulation when users look at the virtual objects;

associating, by the computing device of the first user, the gaze-dependent personalized data of the second user with the first user;

identifying by the computing device of the first user, a gaze direction of the first user within the computer simulation;

determining, by the computing device of the first user and based on the gaze direction of the first user within the computer simulation, that the first user is looking at a particular virtual object of the particular type within the computer simulation; and based at least in part on determining that the first user is looking at the particular virtual object of the particular type within the computer simulation, altering by the computing device of the first user, an appearance of the particular virtual object of the particular type within the computer simulation for the first user using the gaze-dependent personalization data of the second user.

2. The method of claim 1, wherein the gaze-dependent personalization data of the second user is received in response to the first user requesting gaze-dependent personalization data from users that are characterized as friends of the first user.

3. The method of claim 1, wherein the personalized appearance characteristics include characteristics that are associated with peril, humor, or visibility of the particular types of virtual objects.

4. The method of claim 1, wherein the gaze-dependent personalization data of the second user is associated with the first user in response to the first user accepting the gaze-dependent personalization data.

5. The method of claim 1, wherein the gaze direction of the first user is detected using one or more cameras of a virtual reality or augmented reality headset that is worn by the first user.

6. The method of claim 1, wherein the gaze-dependent personalization data of the second user with the first user in response to determining that the particular virtual object is to be visualized within the computer simulation.

7. The method of claim 1, wherein the computing device of the first user comprise a gaming console of the first user, and wherein the gaze-dependent personalization data is generated through one or more interactions between the second user and a different gaming console.

8. One or more non-transitory computer-readable media that store instructions which, when executed by one or more computer processors, cause the one or more computer processors to perform operations comprising:

receiving, by a computing device of a first user, gaze-dependent personalization data of a different, second user, the gaze-dependent personalization data identifying one or more respective personalized appearance characteristics that (i) the second user has associated with particular types of virtual objects, and (ii) are to be used to alter an appearance of virtual objects of a particular type within a computer simulation when users look at the virtual objects;

associating, by the computing device of the first user, the gaze-dependent personalized data of the second user with the first user;

identifying, by the computing device of the first user, a gaze direction of the first user within the computer simulation;

determining, by the computing device of the first user and based on the gaze direction of the first user within the computer simulation, that the first user is looking at a particular virtual object of the particular type within the computer simulation; and based at least in part on determining that the first user is looking at the particular virtual object of the particular type within the computer simulation, altering, by the computing device of the first user, an appearance of the particular virtual object of the particular type within the computer simulation for the first user using the gaze-dependent personalization data of the second user.

9. The media of claim 8, wherein the gaze-dependent personalization data of the second user is received in response to the first user requesting gaze-dependent personalization data from users that are characterized as friends of the first user.

10. The media of claim 8, wherein the personalized appearance characteristics include characteristics that are associated with peril, humor, or visibility of the particular types of virtual objects.

11. The media of claim 8, wherein the gaze-dependent personalization data of the second user is associated with the first user in response to the first user accepting the gaze-dependent personalization data.

12. The media of claim 8, wherein the gaze direction of the first user is detected using one or more cameras of a virtual reality or augmented reality headset that is worn by the first user.

13. The media of claim 8, wherein the gaze-dependent personalization data of the second user with the first user in response to determining that the particular virtual object is to be visualized within the computer simulation.

14. The media of claim 8, wherein the computing device of the first user comprise a gaming console of the first user, and wherein the gaze-dependent personalization data is generated through one or more interactions between the second user and a different gaming console.

15. A system comprising:
one or more computer processors, and
one or more non-transitory computer-readable media that store instructions which, when executed by the one or more computer processors, cause the one or more computer processors to perform operations comprising:

receiving, by a computing device of a first user, gaze-dependent personalization data of a different, second user, the gaze-dependent personalization data identifying one or more respective personalized appearance characteristics that (i) the second user has associated with particular types of virtual objects, and (ii) are to be used to alter an appearance of virtual objects of a particular type within a computer simulation when users look at the virtual objects;

associating, by the computing device of the first user, the gaze-dependent personalized data of the second user with the first user;

identifying, by the computing device of the first user, a gaze direction of the first user within the computer simulation;

determining, by the computing device of the first user and based on the gaze direction of the first user within the computer simulation, that the first user is looking at a particular virtual object of the particular type within the computer simulation; and based at least in part on determining that the first user is looking at the particular virtual object of the particular type within the computer simulation, altering, by the computing device of the first user, an appearance of the particular virtual object of the particular type within the computer simulation for the first user using the gaze-dependent personalization data of the second user.

16. The system of claim 15, wherein the gaze-dependent personalization data of the second user is received in response to the first user requesting gaze-dependent personalization data from users that are characterized as friends of the first user.

17. The system of claim 15, wherein the personalized appearance characteristics include characteristics that are associated with peril, humor, or visibility of the particular types of virtual objects.

18. The system of claim 15, wherein the gaze-dependent personalization data of the second user is associated with the first user in response to the first user accepting the gaze-dependent personalization data.

19. The system of claim 15, wherein the gaze direction of the first user is detected using one or more cameras of a virtual reality or augmented reality headset that is worn by the first user.

20. The system of claim 15, wherein the gaze-dependent personalization data of the second user with the first user in response to determining that the particular virtual object is to be visualized within the computer simulation.

\* \* \* \* \*

UNITED STATES PATENT AND TRADEMARK OFFICE
CERTIFICATE OF CORRECTION

| | |
|---|---|
| PATENT NO. | : 12,296,261 B2 |
| APPLICATION NO. | : 18/045777 |
| DATED | : May 13, 2025 |
| INVENTOR(S) | : Sepideh Karimi |

Page 1 of 1

It is certified that error appears in the above-identified patent and that said Letters Patent is hereby corrected as shown below:

In the Claims

Column 9, Line 6: In Claim 1, after "identifying" insert -- , --.

Column 9, Line 16: In Claim 1, after "altering" insert -- , --.

Column 10, Line 38: In Claim 15, delete "processors," and insert -- processors; --.

Signed and Sealed this
Twenty-fourth Day of June, 2025

Coke Morgan Stewart
*Acting Director of the United States Patent and Trademark Office*